(12) United States Patent
Chang

(10) Patent No.: US 10,758,937 B2
(45) Date of Patent: Sep. 1, 2020

(54) PHOSPHOR DEVICE COMPRISING PLURAL PHOSPHOR AGENTS FOR CONVERTING WAVEBAND LIGHT INTO PLURAL COLOR LIGHTS

(71) Applicant: Delta Electronics, Inc., Taoyuan (TW)

(72) Inventor: Keh-Su Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/445,664

(22) Filed: Jun. 19, 2019

(65) Prior Publication Data

US 2019/0299246 A1    Oct. 3, 2019

Related U.S. Application Data

(63) Continuation of application No. 16/391,158, filed on Apr. 22, 2019, which is a continuation-in-part of (Continued)

(30) Foreign Application Priority Data

Mar. 25, 2019    (CN) .......................... 2019 1 0227727

(51) Int. Cl.
*F21V 9/08*    (2018.01)
*B05D 5/06*    (2006.01)
(Continued)

(52) U.S. Cl.
CPC .................. *B05D 5/06* (2013.01); *F21V 9/08* (2013.01); *F21V 9/30* (2018.02); *F21V 9/38* (2018.02);
(Continued)

(58) Field of Classification Search
CPC ... B05D 5/06; F21V 13/08; F21V 9/08; F21V 9/30; G03B 21/204; H04N 9/3105; H04N 9/3114; H04N 9/3158
(Continued)

(56) References Cited

U.S. PATENT DOCUMENTS 3,999,062 A    12/1976    Demsky et al.
5,967,636 A *  10/1999    Stark ..................... H04N 9/3129
                                                          348/743
(Continued)

FOREIGN PATENT DOCUMENTS

CN    1536376 A    10/2004
CN    1547266 A    11/2004
(Continued)

*Primary Examiner* — Que Tan Le
(74) *Attorney, Agent, or Firm* — Kirton McConkie; Evan R. Witt

(57) ABSTRACT

A phosphor device of an illumination system emitting a first waveband light includes a substrate and a phosphor layer formed on the substrate. The phosphor layer includes a first phosphor agent and a second phosphor agent. The first waveband light is converted into a first color light by the first phosphor agent. The second phosphor agent is distributed over the first phosphor agent and mixed with the first phosphor agent, and the first waveband light is converted into a second color light by the second phosphor agent. The first color light and the second color light are integrated into the second waveband light. The difference between the first wavelength peak of the first color light and the second wavelength peak of the second color light is 50 to 100 nanometers. Therefore, the advantages of increasing the purity, the luminance and the luminous intensity of specific color light are achieved.

14 Claims, 14 Drawing Sheets

Related U.S. Application Data application No. 15/403,995, filed on Jan. 11, 2017, now Pat. No. 10,310,363, which is a continuation-in-part of application No. 14/979,128, filed on Dec. 22, 2015, now Pat. No. 9,726,335, which is a continuation-in-part of application No. 14/478,579, filed on Sep. 5, 2014, now Pat. No. 9,274,407, which is a continuation of application No. 13/617,201, filed on Sep. 14, 2012, now Pat. No. 9,024,241.

(60) Provisional application No. 62/770,401, filed on Nov. 21, 2018, provisional application No. 61/537,687, filed on Sep. 22, 2011.

(51) Int. Cl.
    *F21V 13/08* (2006.01)
    *H04N 9/31* (2006.01)
    *G03B 21/20* (2006.01)
    *F21V 9/30* (2018.01)
    *F21V 9/38* (2018.01)

(52) U.S. Cl.
    CPC ............ *F21V 13/08* (2013.01); *G03B 21/204* (2013.01); *H04N 9/3105* (2013.01); *H04N 9/3114* (2013.01); *H04N 9/3158* (2013.01); *H04N 9/3164* (2013.01); *B32B 2307/422* (2013.01)

(58) Field of Classification Search
    USPC ........................................ 250/226, 216, 239
    See application file for complete search history.

(56) References Cited

U.S. PATENT DOCUMENTS

| | | | |
|---|---|---|---|
| 5,998,925 A | 12/1999 | Shimizu et al. | |
| 6,294,800 B1 | 9/2001 | Duggal et al. | |
| 6,467,910 B1 | 10/2002 | Sato | |
| 6,685,852 B2 | 2/2004 | Setlur et al. | |
| 6,884,671 B2 | 4/2005 | Jenq | |
| 7,547,114 B2 | 6/2009 | Li et al. | |
| 7,654,681 B2 | 2/2010 | Kim et al. | |
| 7,737,621 B2 | 6/2010 | Masuda et al. | |
| 7,863,635 B2 | 1/2011 | Andrews et al. | |
| 7,906,892 B2 | 3/2011 | Choi et al. | |
| 8,173,974 B2 | 5/2012 | Zheng et al. | |
| 8,556,437 B2 | 10/2013 | Miyake | |
| 8,558,448 B2 | 10/2013 | Harada | |
| 8,562,141 B2 | 10/2013 | Ogino | |
| 8,662,678 B2 | 3/2014 | Hirata et al. | |
| 8,733,940 B2 | 5/2014 | Tanaka et al. | |
| 9,175,830 B2 | 11/2015 | Yang et al. | |
| 2005/0184298 A1 | 8/2005 | Ueda | |
| 2005/0206301 A1 | 9/2005 | Ng | |
| 2005/0270775 A1 | 12/2005 | Harbers et al. | |
| 2006/0226759 A1 | 10/2006 | Masuda et al. | |
| 2008/0211386 A1 | 9/2008 | Choi et al. | |
| 2009/0034284 A1 | 2/2009 | Li et al. | |
| 2009/0039375 A1 | 2/2009 | LeToquin et al. | |
| 2009/0051884 A1 | 2/2009 | Kuan et al. | |
| 2009/0224177 A1 | 9/2009 | Kinomoto et al. | |
| 2010/0213821 A1 | 8/2010 | Masuda et al. | |
| 2010/0220298 A1 | 9/2010 | Wang et al. | |
| 2010/0264448 A1 | 10/2010 | Choi et al. | |
| 2010/0314650 A1 | 12/2010 | Sugimori | |
| 2010/0315320 A1 | 12/2010 | Yoshida | |
| 2010/0328626 A1 | 12/2010 | Miyazaki | |
| 2011/0018026 A1 | 1/2011 | Konno et al. | |
| 2011/0043761 A1 | 2/2011 | Miyamae | |
| 2011/0051095 A1 | 3/2011 | Narimatsu et al. | |
| 2011/0057118 A1 | 3/2011 | Zheng et al. | |
| 2011/0063581 A1 | 3/2011 | Iwanaga | |
| 2011/0089456 A1 | 4/2011 | Andrews et al. | |
| 2011/0096300 A1 | 4/2011 | Shibasaki | |
| 2011/0149549 A1 | 6/2011 | Miyake | |
| 2011/0156071 A1 | 6/2011 | Cheng et al. | |
| 2011/0188010 A1 | 8/2011 | Lin et al. | |
| 2011/0199580 A1 | 8/2011 | Hirata et al. | |
| 2011/0205502 A1 | 8/2011 | Kato et al. | |
| 2011/0211333 A1 | 9/2011 | Bartlett | |
| 2011/0227477 A1 | 9/2011 | Zhang et al. | |
| 2011/0228232 A1 | 9/2011 | Sakata et al. | |
| 2011/0228514 A1 | 9/2011 | Tong et al. | |
| 2011/0248296 A1 | 10/2011 | Choi et al. | |
| 2011/0261326 A1 | 10/2011 | Wang et al. | |
| 2011/0310353 A1 | 12/2011 | Maeda | |
| 2011/0310362 A1 | 12/2011 | Komatsu | |
| 2012/0039065 A1 | 2/2012 | Sun et al. | |
| 2012/0062857 A1 | 3/2012 | Saitou et al. | |
| 2012/0267998 A1 | 10/2012 | Sohn et al. | |
| 2013/0050654 A1 | 2/2013 | Hu et al. | |
| 2013/0113365 A1 | 5/2013 | Yamasuge et al. | |
| 2013/0228812 A1 | 9/2013 | Annen et al. | |
| 2013/0234591 A1 | 9/2013 | Hattori et al. | |
| 2013/0307011 A1 | 11/2013 | Yamakawa et al. | |
| 2014/0146293 A1 | 5/2014 | Hirata et al. | |
| 2014/0334181 A1 | 11/2014 | Hu et al. | |
| 2015/0098070 A1 | 4/2015 | Hsieh et al. | |
| 2015/0184066 A1 | 7/2015 | Kwon et al. | |

FOREIGN PATENT DOCUMENTS

| | | |
|---|---|---|
| CN | 1837893 A | 9/2006 |
| CN | 1929155 A | 3/2007 |
| CN | 101212015 A | 7/2008 |
| CN | 101354481 A | 1/2009 |
| CN | 100517781 C | 7/2009 |
| CN | 100533795 C | 8/2009 |
| CN | 101562227 A | 10/2009 |
| CN | 101650311 A | 2/2010 |
| CN | 101937164 A | 1/2011 |
| CN | 201717287 U | 1/2011 |
| CN | 101995748 A | 3/2011 |
| CN | 102073115 A | 5/2011 |
| CN | 102155639 A | 8/2011 |
| CN | 102156639 A | 8/2011 |
| CN | 202109406 U | 1/2012 |
| CN | 102650811 A | 8/2012 |
| CN | 103018864 A | 4/2013 |
| CN | 104101975 A | 10/2014 |
| CN | 104379987 A | 2/2015 |
| CN | 104676491 A | 6/2015 |
| DE | 101937162 A | 1/2011 |
| EP | 2271120 A1 | 1/2011 |
| EP | 2339655 A2 | 6/2011 |
| EP | 2355524 A1 | 8/2011 |
| EP | 2360523 A1 | 8/2011 |
| EP | 2362452 A2 | 8/2011 |
| EP | 2749943 A1 | 7/2014 |
| JP | 2003295319 A | 10/2003 |
| JP | 2004325874 A | 11/2004 |
| JP | 2007156270 A | 6/2007 |
| JP | 2008124504 A | 5/2008 |
| JP | 2009245712 A | 10/2009 |
| JP | 2009277516A A | 11/2009 |
| JP | 2010515096 A | 5/2010 |
| JP | 2011048139 A | 3/2011 |
| JP | 2011071404 A | 4/2011 |
| JP | 2011100163 A | 5/2011 |
| JP | 2011128522 A | 6/2011 |
| JP | 2011165555 A | 8/2011 |
| JP | 2011168627 A | 9/2011 |
| JP | 2011175000 A | 9/2011 |
| JP | 2011197212 A | 10/2011 |
| JP | 2012137744A A | 7/2012 |
| JP | 2012203366A A | 10/2012 |
| JP | 5459537 B2 | 4/2014 |
| JP | 2016081054 A | 5/2016 |
| JP | 2017027685 A | 2/2017 |
| JP | 2017117773 A | 6/2017 |
| JP | 2017138470 A | 8/2017 |
| JP | 2017216244 A | 12/2017 |
| TW | 200912475 A | 3/2009 |

(56) References Cited

FOREIGN PATENT DOCUMENTS

| TW | 201000617 A | 1/2010 |
|---|---|---|
| TW | 201251136 A | 12/2012 |
| TW | 201418414 A | 5/2014 |
| TW | I448806 B | 8/2014 |
| WO | 2009/017992 A1 | 2/2009 |
| WO | 2012135744 A2 | 10/2012 |
| WO | 2013029463 A1 | 3/2013 |

\* cited by examiner

PHOSPHOR DEVICE COMPRISING PLURAL PHOSPHOR AGENTS FOR CONVERTING WAVEBAND LIGHT INTO PLURAL COLOR LIGHTS

CROSS-REFERENCE TO RELATED APPLICATION

This application is a continuation application of U.S. application Ser. No. 16/391,158 filed on Apr. 22, 2019, which claims the benefit of U.S. Provisional Application No. 62/770,401 filed on Nov. 21, 2018, and claims priority of Chinese Application No. 201910227727.6 filed on Mar. 25, 2019. The U.S. application Ser. No. 16/391,158 is also a continuation-in-part application of U.S. application Ser. No. 15/403,995 filed on Jan. 11, 2017, which is a continuation-in-part application of U.S. application Ser. No. 14/979,128 filed on Dec. 22, 2015, which is a continuation-in-part application of U.S. application Ser. No. 14/478,579 filed on Sep. 5, 2014, which is a continuation application of U.S. application Ser. No. 13/617,201 filed on Sep. 14, 2012 that claims the benefit of U.S. Provisional Application No. 61/537,687 filed on Sep. 22, 2011. Each of the aforementioned patent applications is incorporated herein by reference.

FIELD OF THE INVENTION

The present disclosure relates to a phosphor device, and more particularly to a phosphor device applied to an illumination system.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a display screen. For reducing power consumption and overall volume, the illumination system of the current projector employs a solid-state light-emitting element (e.g. light emitting diode or laser diode) to replace the conventional high intensity discharge (HID) lamp.

Generally, the illumination system of the projector may emit three primary color lights, i.e. red light (R), green light (G) and blue light (B). Among the architecture of emitting red light, a solid-state light-emitting elements is commonly used to emit an excitation light to a wavelength conversion device (e.g. a phosphor color wheel) coated with a yellow phosphor agent, and the light is filtered through a filter to obtain the desired red light. However, in this architecture, the purity of the red light obtained is not good, and the conversion efficiency is not good.

In another commonly used architecture, a solid-state light-emitting element is used to emit an excitation light to a wavelength conversion device coated with a red phosphor agent, so as to emit red light, but the thermal stability of this architecture is poor. In addition, a solid-state light-emitting element can also be used to directly emit red laser light to obtain high-purity red light. However, the cost of manufacturing such architecture is expensive, and an additional cooling system is required, so the cost involved is high.

For overcoming the drawbacks of the conventional technologies, there is a need of providing an improved phosphor device.

SUMMARY OF THE INVENTION

An object of the present disclosure provides a phosphor device to address the issues encountered by the prior arts.

In accordance with an aspect of the present disclosure, there is provided a phosphor device. The phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved.

In accordance with another aspect of the present disclosure, there is provided phosphor device. By utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good.

In accordance with another aspect of the present disclosure, there is provided a phosphor device. By utilizing the second phosphor emitting light having a wavelength peak within a specific range and having a high luminous coefficient, the luminance and the purity of the specific color light can be effectively enhanced.

In accordance with another aspect of the present disclosure, there is provided a phosphor device. Since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light. The difference between the first wavelength peak and the second wavelength peak is larger than or equal to 50 nanometers, and less than or equal to 100 nanometers.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light, and the wavelength peak of the second waveband light is between the first wavelength peak and the second wavelength peak. The ratio of the weight of the first phosphor agent to the second phosphor agent is 2 to 15.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light. The first wavelength peak is larger than or equal to 540 nanometers, and less than or equal to 570 nanometers. The second wavelength peak is larger than or equal to 600 nanometers, and less than or equal to 640 nanometers.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent. The second phosphor agent is distributed over the first phosphor agent and mixed with the first phosphor agent, and the first waveband light is converted into a second color light by the second phosphor agent. The first color light and the second color light are integrated into the second waveband light, and the range of the spectrum of the first color light is at least partially overlapped with the range of the spectrum of the second color light. The full width at half maximum of the spectrum of the first color light is less than 120 nanometers, and the full width at half maximum of the spectrum of the second color light is less than 90 nanometers.

In an embodiment, the phosphor device of an illumination system emitting a first waveband light includes a substrate, a phosphor layer, a reflective layer and a third phosphor agent. The substrate includes a first section and a second section. The phosphor layer is formed on the first section for converting the first waveband light into a second waveband light, and the phosphor layer includes a first phosphor agent and a second phosphor. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The reflective layer is disposed between the first section of the substrate and the phosphor layer, and the reflective layer has a reflectance spectrum with a reflectivity corresponded to the second color light greater than the reflectivity corresponded to the second color light of aluminum. The third phosphor agent is formed on the second section, and the first waveband light is converted into a third waveband light by the third phosphor agent. The first color light and the second color light are integrated into the second waveband light. The difference between the first wavelength peak and the second wavelength peak is larger than or equal to 50 nanometers, and less than or equal to 100 nanometers.

In an embodiment, the phosphor device of an illumination system emitting a first waveband light includes a substrate, a phosphor layer and a reflective layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is converted into a second color light by the second phosphor agent, and the second color light has a second wavelength peak. The second phosphor agent is distributed over the first phosphor layer with an average distribution or a gradient distribution, or the second phosphor agent is mixed with the first phosphor agent as a mixture. The weight percentage of the second phosphor agent is less than 85% relative to the first phosphor agent. The reflective layer is for reflecting at least the second waveband light. The first color light and the second color light are integrated into the second waveband light, and the range of the spectrum of the first color light is at least partially overlapped with the range of the spectrum of the second color light. The difference between the first wavelength peak and the second wavelength peak is larger than or equal to 50 nanometers, and less than or equal to 100 nanometers.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
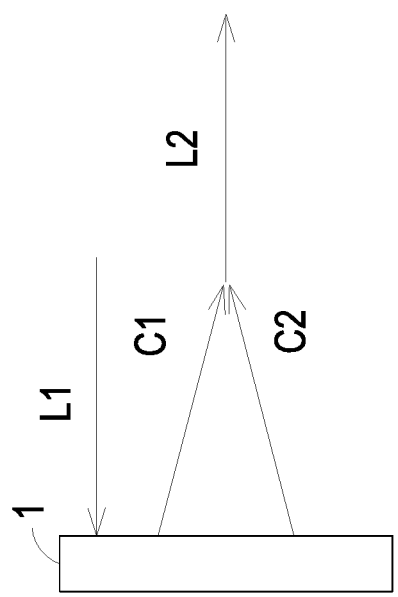
FIG. 1A schematically illustrates the concept of an illumination system with a phosphor device according to an embodiment of the present disclosure.
Figure 1B:
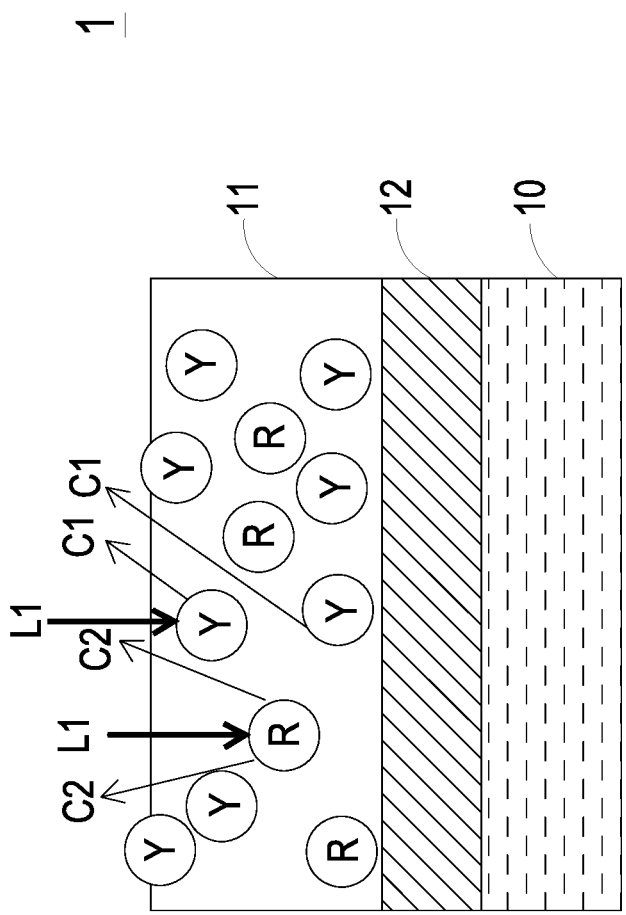
FIG. 1B schematically illustrates the structure of a phosphor device shown in FIG. 1A.
Figure 2:
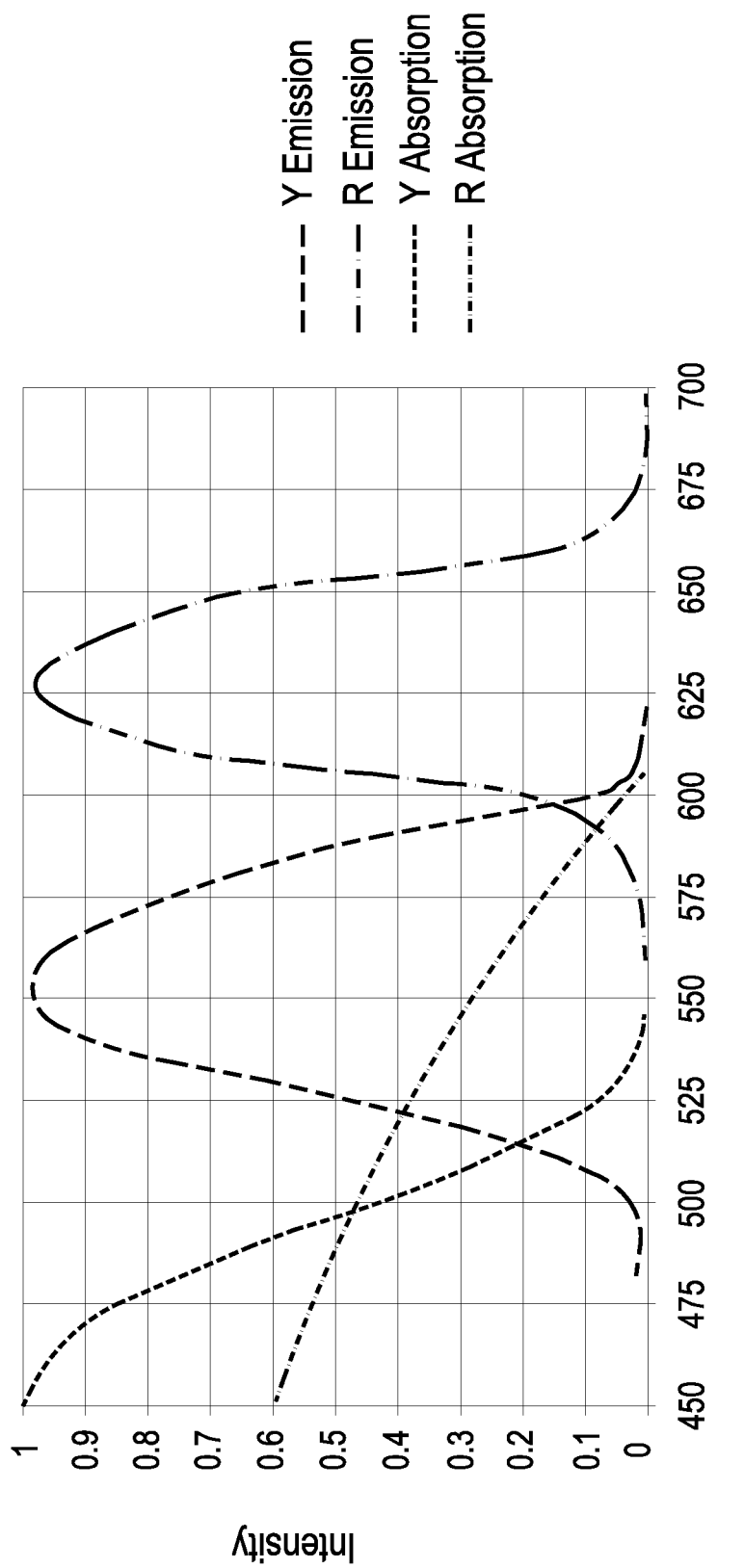
FIG. 2 schematically illustrates the absorption spectra and the emission spectra of a first phosphor agent and a second phosphor agent of a phosphor device according to an embodiment of the present disclosure.

Please refer to FIG. 1A, FIG. 1B, and FIG. 2. FIG. 1A schematically illustrates the concept of an illumination system with a phosphor device according to an embodiment of the present disclosure. FIG. 1B schematically illustrates the structure of a phosphor device shown in FIG. 1A. FIG. 2 schematically illustrates the absorption spectra and the emission spectra of a first phosphor agent and a second phosphor agent of a phosphor device according to an embodiment of the present disclosure. As shown in FIG. 1, FIG. 1B and FIG. 2, the phosphor device 1 is used in an illumination system 2 that emits a first waveband light L1. The phosphor device 1 includes a substrate 10 and a phosphor layer 11, and the substrate 10 is a reflective substrate. The phosphor layer 11 is formed on the substrate 10 for converting the first waveband light L1 into a second waveband light L2. The first waveband light L1 can be blue light or ultraviolet light, and the second waveband light L2 can be orange light, but not limited herein. In addition, the substrate 10 can be a substrate having no optical characters, such as a ceramic substrate on which the phosphor layer 11 can be disposed.

The phosphor layer 11 includes a first phosphor agent Y and a second phosphor agent R. The first waveband light L1 is converted into a first color light C1 by the first phosphor agent Y, and the spectrum shown by the first color light C1 has a specific wavelength range and includes a first wavelength peak. The composition of the second phosphor agent R is distributed over the first phosphor agent Y and mixed with the first phosphor agent Y. The first waveband light L1 is converted into a second color light C2 by the second phosphor agent R, and the spectrum shown by the second color light C2 has a specific wavelength range and includes a second wavelength peak. The first color light C1 and the second color light C2 are integrated into the second waveband light L2. The difference between the first wavelength peak and the second wavelength peak is larger than or equal to 50 nanometers, and less than or equal to 100 nanometers. Furthermore, the wavelength peak of the second waveband light L2 is between the first wavelength peak of the first color light C1 and the second wavelength peak of the second color light C2. Besides, the first color light C1 and the second color light C2 in the figures are shown separately and then concentrated in the traveling direction for the purpose of expressing that they are integrated into the second waveband light L2. In other words, the second waveband light L2 refers to the entirety of the first color light C1 and the second color light C2 emitted from the phosphor device 1.

In this embodiment and the following embodiments, the first phosphor agent Y can be a yellow phosphor agent, and includes YAG materials, so that the first waveband light L1 is converted into the first color light C1, which is shown as yellow light, by the first phosphor agent Y. The second phosphor agent R can be a red phosphor agent, and includes nitride phosphor materials, so that the first waveband light L1 is converted into the second color light C2, which is shown as red light, by the second phosphor agent R. The first color light C1 shown as yellow light and the second color light C2 shown as red light are integrated into the second waveband light L2, which is shown as orange light, and the range of the spectrum of the first color light C1 is at least partially overlapped with the range of the spectrum of the second color light C2. Therefore, the purity, the luminance and the luminous intensity of the red light outputted by the light source system 2 after being filtered are enhanced. In some embodiments, the full width at half maximum (FWHM) of the spectrum of the first color light C1 emitted though the conversion of the first phosphor agent Y is less than 120 nanometers, and the full width at half maximum of the spectrum of the second color light C2 emitted through the conversion of the second color agent R is less than 90 nanometers, thereby obtaining the light with higher light purity, but not limited herein.

In some embodiments, the second phosphor agent R can be distributed over the first phosphor layer Y with an average distribution or a gradient distribution, or the second phosphor agent R can be mixed with the first phosphor agent Y as a mixture. Preferably, the ratio of the weight of the first phosphor agent Y to the second phosphor agent R is 2 to 15. Alternatively, the weight percentage of the second phosphor agent R is less than 85% relative to the first phosphor agent Y. Therefore, the purity, the luminance and the luminous intensity of the red light outputted by the light source system 2 after being filtered are effectively enhanced, but not limited herein.

In some embodiments, the phosphor device 1 further includes a reflective layer 12 disposed between the substrate 10 and the phosphor layer 11, so that at least the second waveband light L2 is reflected by the reflective layer 12. In some embodiments, the reflective layer 12 can be, for example but not limited to, a diffuse reflective layer consisting of at least one of white glue and inorganic metal oxide particles such as $SiO_2$, $TiO_2$, $Al_2O_3$, $ZrO_2$, ZnO and BN particles, and all of visible light is reflected by diffuse reflective layer, so as to increase the overall light output efficiency, among which the thickness of the diffuse reflective layer can be 20 to 150 micrometers, but not limited herein. In some embodiments, the reflective layer 12 has a reflectance spectrum with a reflectivity corresponded to the second color light greater than the reflectivity corresponded to the second color light of aluminum, thereby enhancing the luminous intensity of the second color light C2, and the reflective layer 12 can be a dielectric film layer, but not limited herein.

Figure 3A:
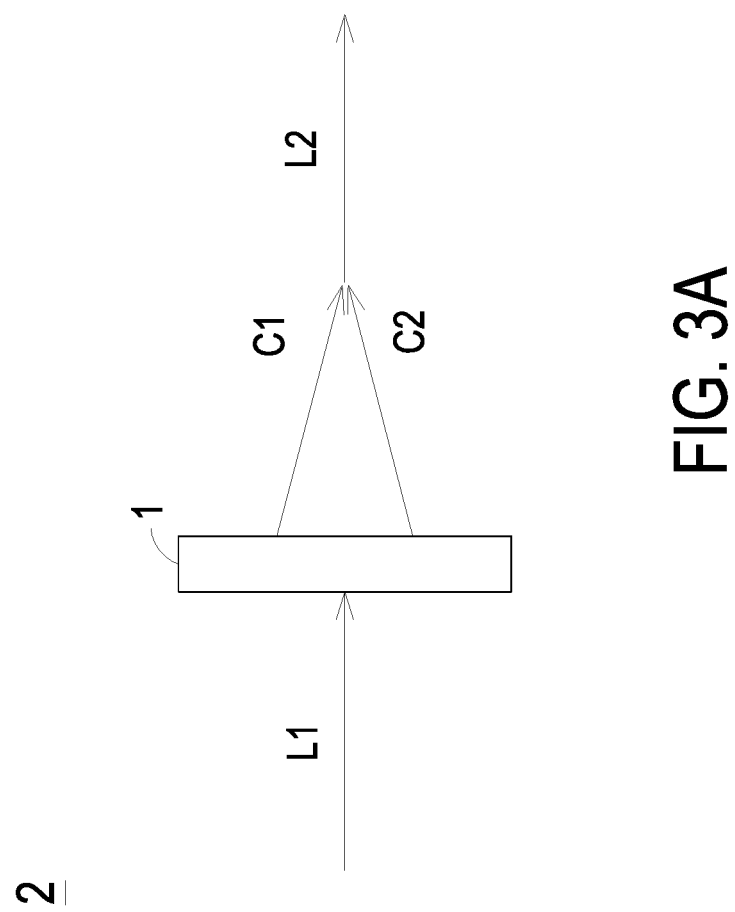
FIG. 3A schematically illustrates the concept of an illumination system with a phosphor device according to another embodiment of the present disclosure.
Figure 3B:
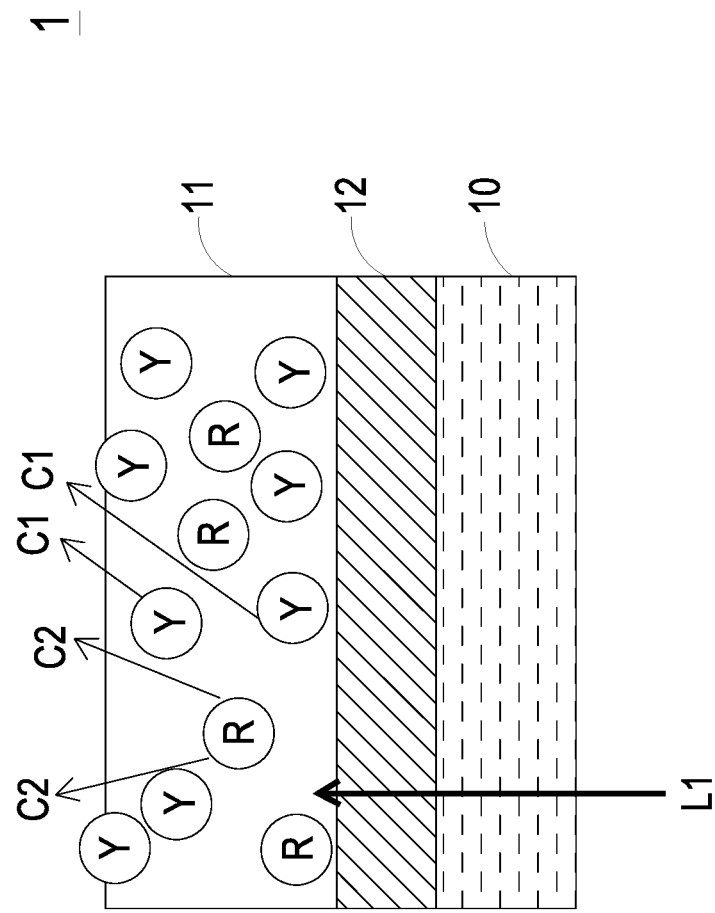
FIG. 3B schematically illustrates the structure of a phosphor device shown in FIG. 3A.

Please refer to FIG. 3A and FIG. 3B. FIG. 3A schematically illustrates the concept of an illumination system with a phosphor device according to another embodiment of the present disclosure. FIG. 3B schematically illustrates the structure of a phosphor device shown in FIG. 3A. As shown in FIGS. 3A and 3B, the phosphor device 1 is used in an illumination system 2 that emits a first waveband light L1. The phosphor device 1 includes a substrate 10 and a phosphor layer 11, and the substrate 10 is a transmissive substrate. The phosphor layer 11 is formed on the substrate 10 for converting the first waveband light L1 into a second waveband light L2, which is obtained from integrating the first color light C1 and the second color light C2. The features of the phosphor layer 11 and respective color light are identical to the previous embodiments, and it is not redundantly described herein. In this embodiments, the phosphor device 1 further includes a reflective layer 12 disposed between the substrate 10 and the phosphor layer 11 for reflecting least the second waveband light L2. In some embodiments, the reflective layer 12 is a dichroic layer, and at least the first color light C1 and the second color light C2 are reflected by the dichroic layer, or a color light having the similar range of wavelength with the second waveband light L2 is reflected by the dichroic layer, but not limited herein. Practically, the dichroic layer can be designed to reflect a desired wavelength range depends on different conditions.

In other words, in the phosphor device of the present disclosure, the phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved.

Figure 4A:
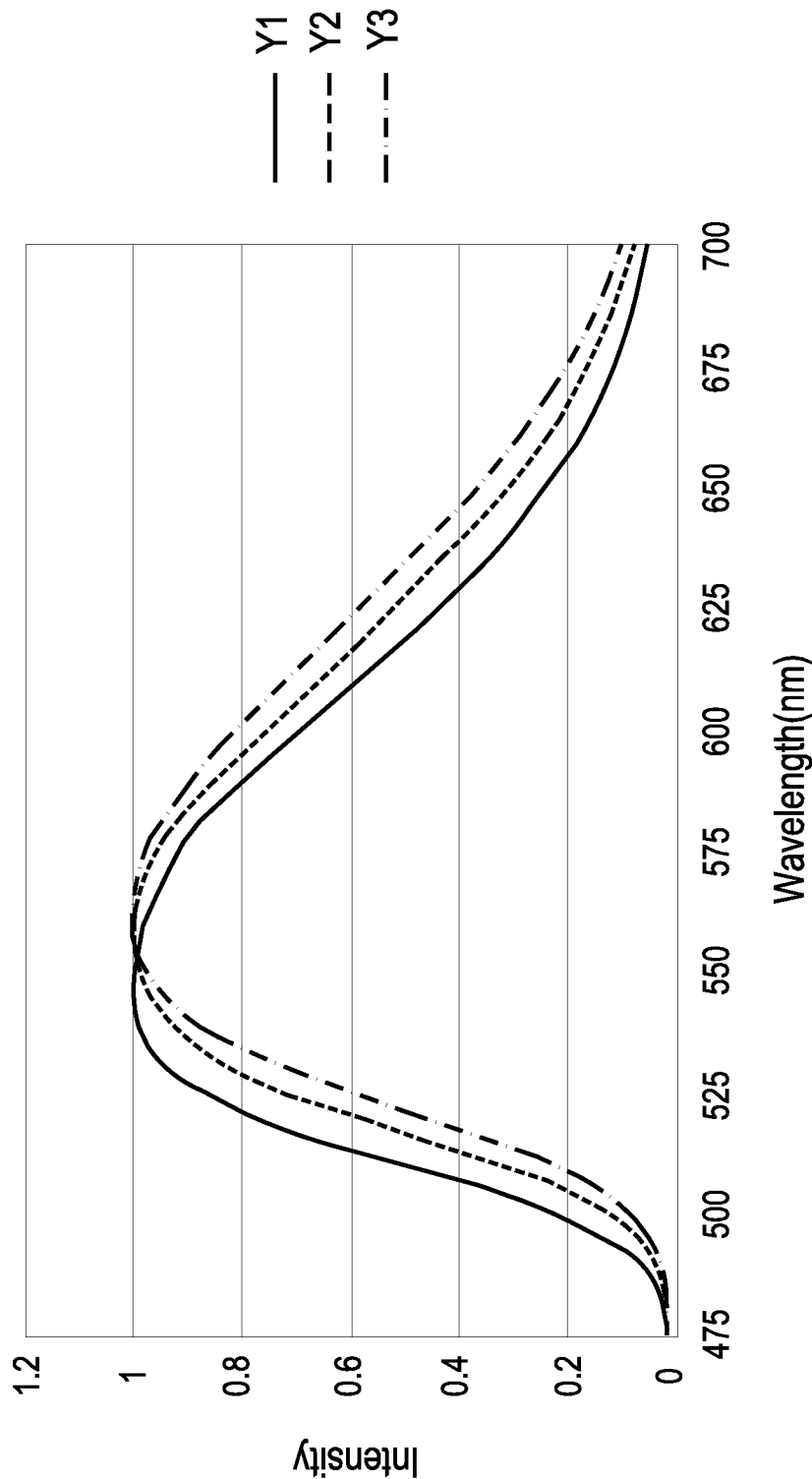
FIG. 4A schematically illustrates the emission spectra of the first phosphor agents of different embodiments.
Figure 4B:
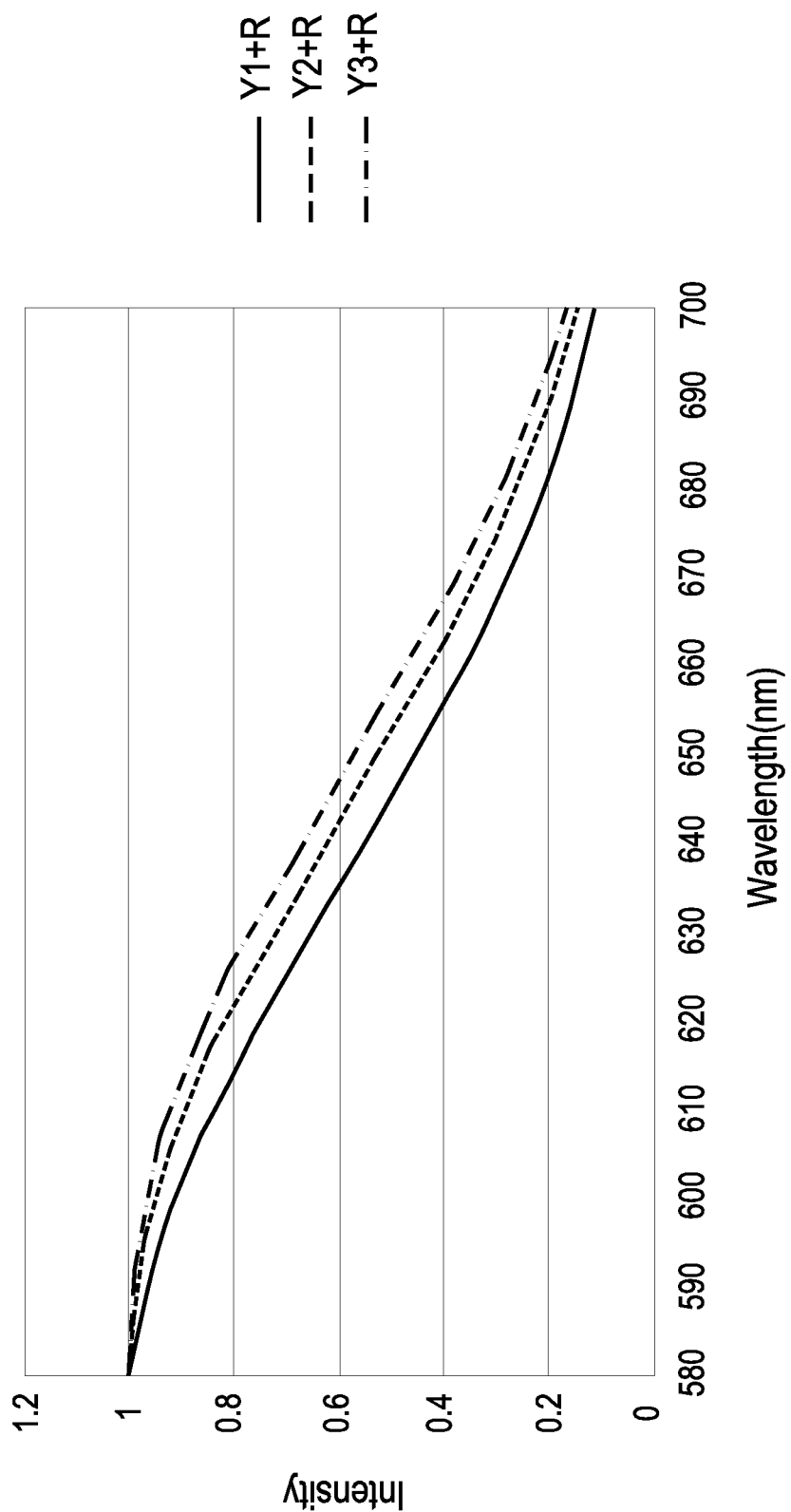
FIG. 4B schematically illustrates the emission spectra of the first phosphor agents of different embodiments mixed with the second phosphor agent.

Please refer to FIG. 2, FIG. 4A and FIG. 4B. FIG. 4A schematically illustrates the emission spectra of the first phosphor agents of different embodiments. FIG. 4B schematically illustrates the emission spectra of the first phosphor agents of different embodiments mixed with the second phosphor agent. As shown in FIG. 2, and FIG. 4A and FIG. 4B, in the first color light C1 emitted though the conversion of the first phosphor agent Y, part of the emitted light may be used as the absorption spectrum by the second phosphor agent R. Therefore, in order to reduce the absorption of the emitted light by the second phosphor agent R, there is a need to select the first phosphor agent Y emitting the light having a longer waveband and wavelength peak, so as to be mixed with the second phosphor agent R.

The first phosphor agents Y1, Y2 and Y3 emitting the first color light C1 having different waveband lengths are provided, and the wavelength peaks of the emitted light thereof is Y1<Y2<Y3, as shown in FIG. 4A. Furthermore, the first phosphor agents Y1, Y2 and Y3 are respectively mixed with the second phosphor agent R, and the light intensity of the red light thereof obtained at the color point Rx=0.670 is compared with the light intensity of the red light of the first phosphor agent Y1, which is not mixed with the second phosphor agent R, so as to obtain the output efficiency as shown in FIG. 4B and the following Table 1. According to the test results, the first phosphor agent Y3 emitting the first color light C1 having longer waveband and wavelength peak is selected to be mixed with the second phosphor agent R, so that the red light having higher intensity and purity is obtained.

TABLE 1

| Mixed phosphor agents | Intensity of red light of the mixed phosphor agents/Intensity of red light of the first phosphor agent Y1 |
|---|---|
| first phosphor agent Y1 + second phosphor agent R | 120% |
| first phosphor agent Y2 + second phosphor agent R | 128% |
| first phosphor agent Y3 + second phosphor agent R | 132% |

Figure 5A:
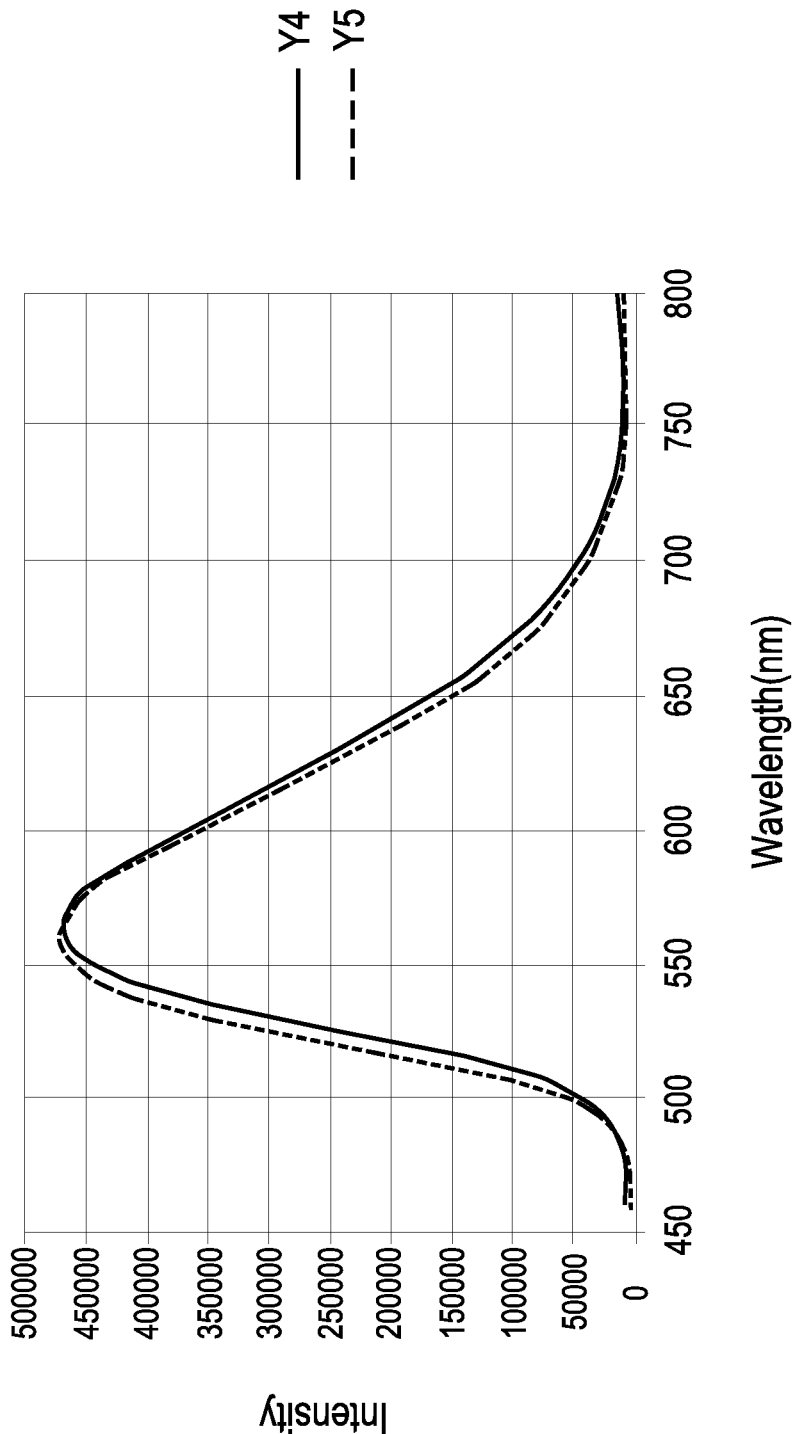
FIG. 5A schematically illustrates the emission spectra of the first phosphor agents doped with Ce of different embodiments at low wattages.
Figure 5B:
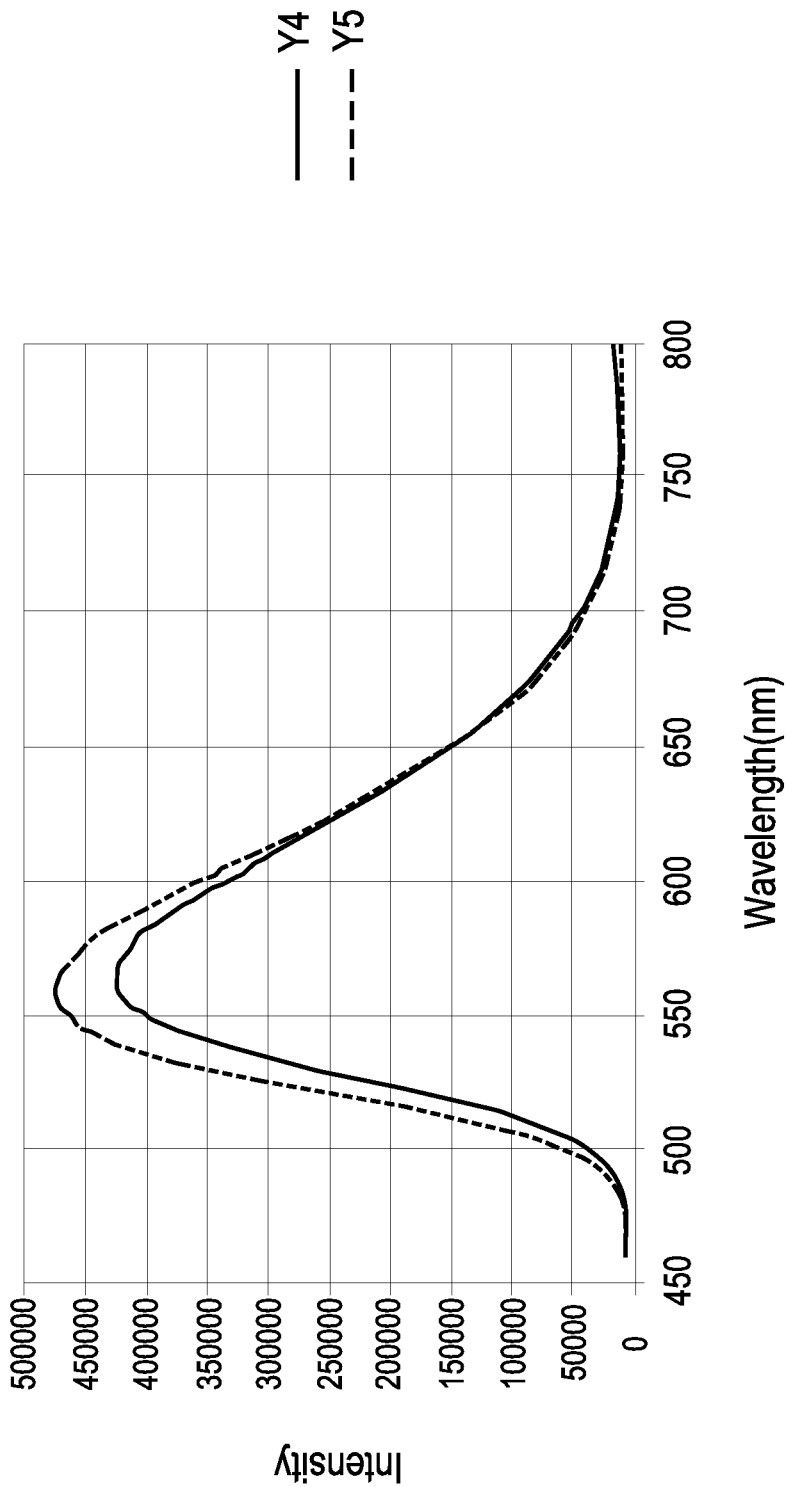
FIG. 5B schematically illustrates the emission spectra of the first phosphor agents doped with Ce of different embodiments at high wattages.

Please refer to FIG. 5A and FIG. 5B. FIG. 5A schematically illustrates the emission spectra of the first phosphor agents doped with Ce of different embodiments at low wattages which means lower radiant pumping power to the phosphor agent. FIG. 5B schematically illustrates the emission spectra of the first phosphor agents doped with Ce of different embodiments at high wattages with higher radiant pumping power. In some embodiments, the first phosphor agent Y can includes the Ce-doped YAG material ($Y_3Al_5O_{12}$). When the Ce doping amount is increased, the emission spectrum of the first phosphor agent Y is redshifted, that is, the wavelength peak of the waveband of the emitted first color light C1 is longer, thereby reducing the absorption of the emitted light by the second phosphor agent R. However, as the Ce doping amount is increased, the defect areas are also increased, which makes the thermal stability worse.

The first phosphor agents Y4 and Y5 emitting the first color light C1 having different waveband lengths due to different Ce doping amounts are provided, the Ce doping amounts thereof is Y4>Y5, and the wavelength peaks of the emitted light thereof is Y4>Y5. Furthermore, the first phosphor agents Y4 and Y5 are applied to the low wattage architecture (about 100 watts) and the high wattage architecture (about 200 watts). According to the test results, in the case of low wattage and low thermal influence, as shown in FIG. 5A, the obtained red light intensity having a wavelength of about 600 nm or more is that Y5 is less than Y4 by about 20%. In the case of high wattage and high thermal influence, as shown in FIG. 5B, the obtained red light intensity having a wavelength of about 600 nm or more is that Y4 is less than Y5 by about 10%. That is to say, at the low wattage, the first phosphor agent Y, which has a larger Ce doping amount and emits the first color light C1 having longer waveband and wavelength peak, can be selected. At the high wattage, since the thermal influence caused by the defects should be considered, the first phosphor agent Y should not be doped with too much Ce, so there is an upper limit for the length of the waveband and the wavelength peak of the first color light C1 emitted by the first phosphor agent Y.

Through considering the effects to the intensity and the purity of the red light due to the factors of the waveband length, the Ce doping amount and the light wattage, preferably, the first phosphor agent Y emitting the color light having the wavelength peak of 540-570 nanometers is selected, that is, the first wavelength peak of the first color C1 is larger than or equal to 540 nanometers, and less than or equal to 570 nanometers. Optimally, the first phosphor agent Y emitting the color light having the wavelength peak of 550-560 nanometers is selected, that is, the first wavelength peak of the first color C1 is larger than or equal to 550 nanometers, and less than or equal to 560 nanometers.

In other words, in the phosphor device of the present disclosure, by utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good.

Figure 6:
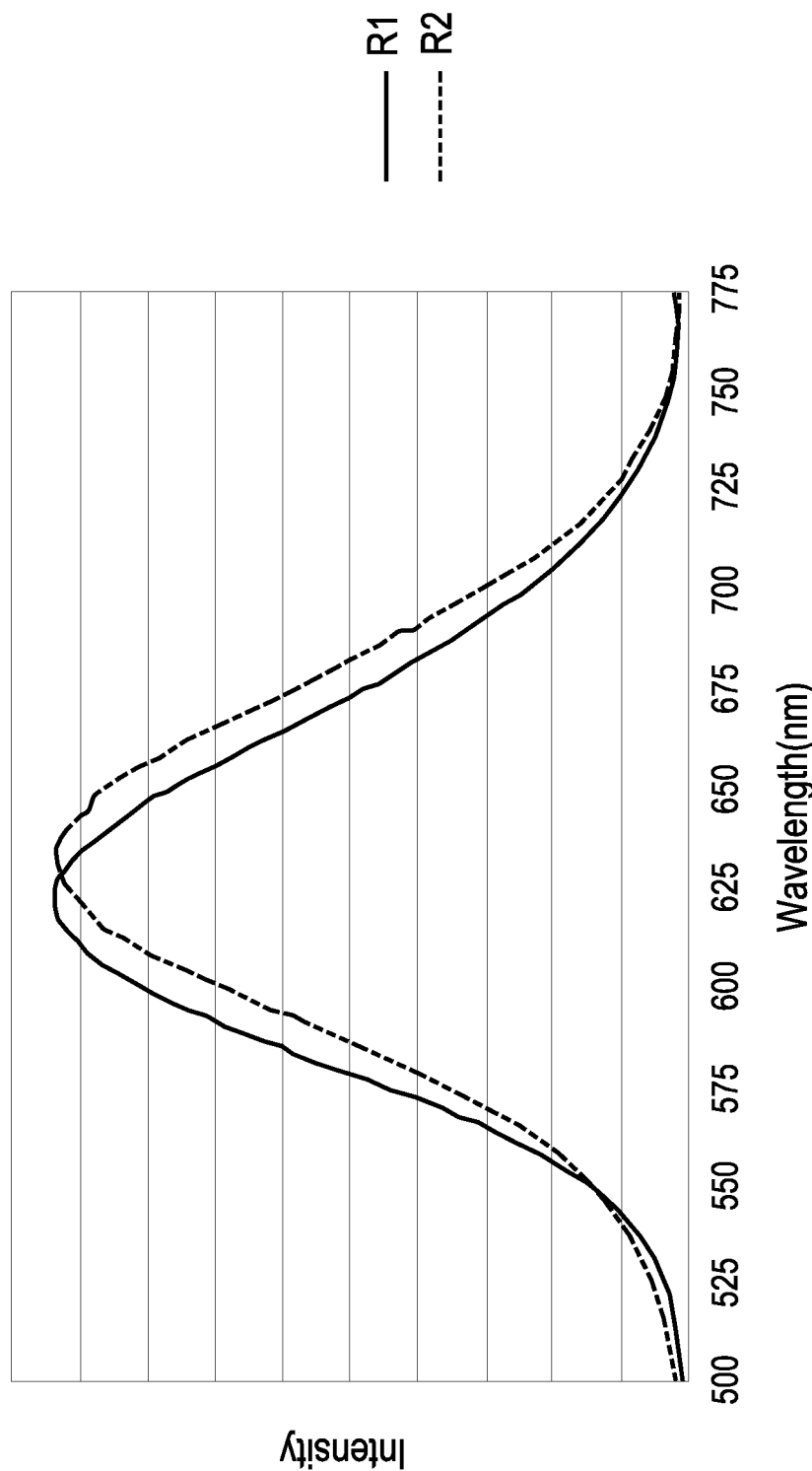
FIG. 6 schematically illustrates the emission spectra of the second phosphor agents of different embodiments.

Please refer to FIG. 6. FIG. 6 schematically illustrates the emission spectra of the second phosphor agents of different embodiments. According to the spectral luminous efficiency, due to the stimulation of colors to the vision of human eyes, different luminance effect is produced by the color lights of different wavebands, and the luminous coefficient of yellow-green light is the highest. The second phosphor agents R1 and R2 emitting the second color light C2 with different waveband lengths are provided, and the light-emitting performance obtained is as shown in FIG. 6 and the following Table 2. According to the test results, the light wattages emitted by the second phosphor agents R1 and R2 are almost the same, but the performance on the luminance has a difference of about 10%, which is mainly due to the effect of the luminous coefficient. In other words, the second phosphor agent R1 emitting the second color light C2 having the waveband length being close to yellow-green light is selected to be mixed with the first phosphor agent Y, so that the red light having higher luminance is obtained.

TABLE 2

|  | Second phosphor agent R1 | Second phosphor agent R2 |
| --- | --- | --- |
| Light wattage (W) | 18.9 | 19.1 |
| Luminous flux (lm) | 5140 | 4660 |
| Wavelength peak (nm) | 624 | 636 |

Figure 7:
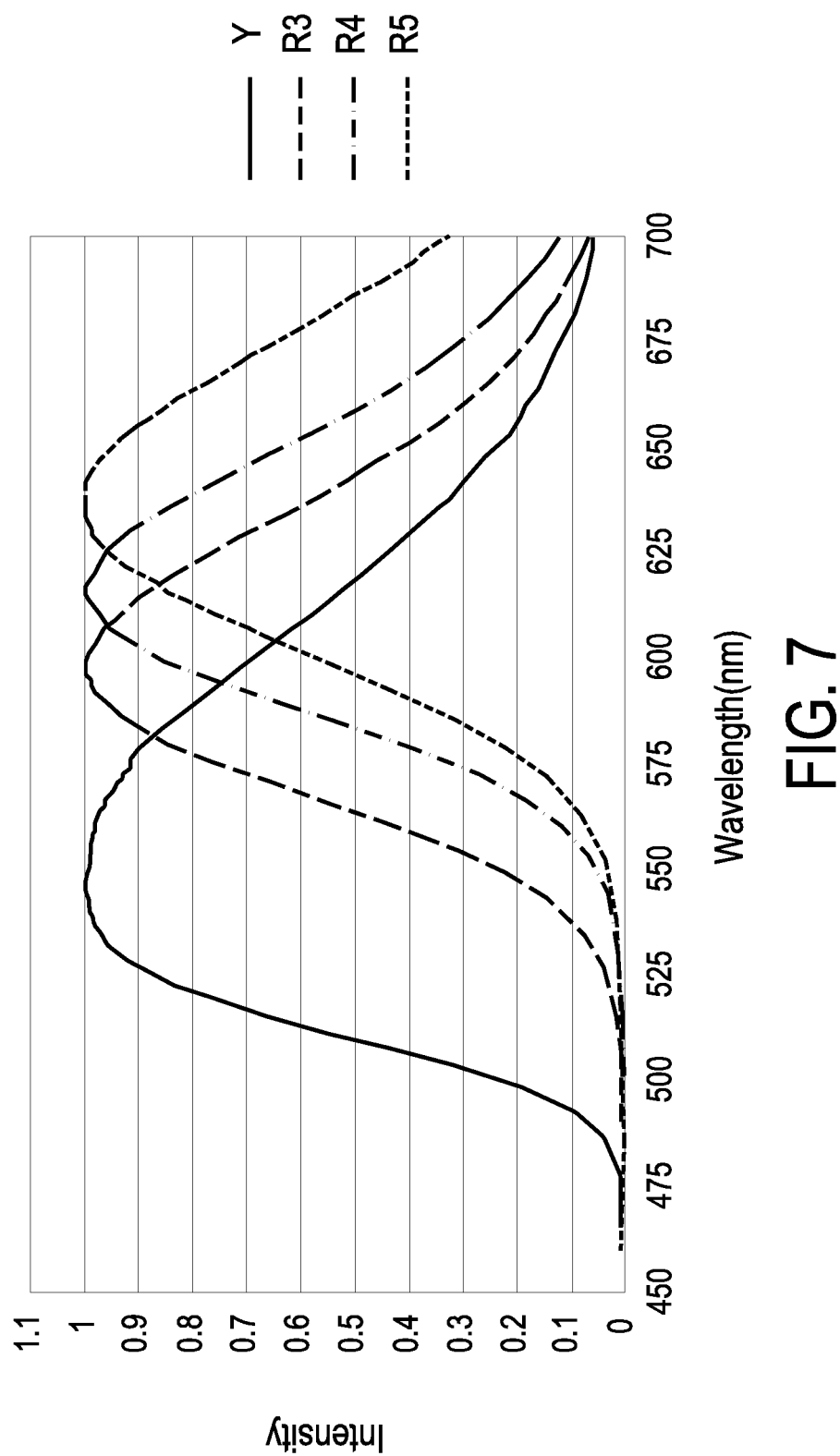
FIG. 7 schematically illustrates the emission spectra of the first phosphor agent and the second phosphor agents of different embodiments.

Please refer to FIG. 7. FIG. 7 schematically illustrates the emission spectra of the first phosphor agent and the second phosphor agents of different embodiments. The second phosphor agents R3, R4 and R5 emitting the second color light C2 with different waveband lengths are provided, and the wavelength peaks of the emitted light thereof is R3<R4<R5. The light intensity and the output efficiency of the first phosphor agent Y and the second phosphors agents R3, R4 and R5 are as shown in FIG. 7 and the following Table 3. According to the test results, the red light intensity of the second phosphor agent R3 emitting the light having the wavelength peak being close to 600 nanometers is lower, and the red light luminance of the second phosphor agent R5 emitting the light having the wavelength peak being close to 640 nanometers is lower.

TABLE 3

|  | Wavelength peak (nm) | Luminance efficiency (lm/W) ratio | Color point x | Color point y |
| --- | --- | --- | --- | --- |
| First phosphor agent Y | 540 | 100% | 0.669 | 0.330 |
| Second phosphor agent R3 | 600 | 109% | 0.670 | 0.329 |
| Second phosphor agent R4 | 620 | 119% | 0.670 | 0.330 |
| Second phosphor agent R5 | 638 | 90% | 0.672 | 0.328 |

Through considering the effects to the intensity and the purity of the red light due to the factors of the luminous coefficient and the waveband length, preferably, the second phosphor agent R emitting the color light having the wavelength peak of 600-640 nanometers is selected, that is, the second wavelength peak of the second color C2 is larger than or equal to 600 nanometers, and less than or equal to 640 nanometers. Optimally, the second phosphor agent R emitting the color light having the wavelength peak of 600-630 nanometers is selected, that is, the second wavelength peak of the second color C2 is larger than or equal to 600 nanometers, and less than or equal to 630 nanometers.

In other words, in the phosphor device of the present disclosure, by utilizing the second phosphor emitting light having a wavelength peak within a specific range and having a high luminous coefficient, the luminance and the purity of the specific color light can be effectively enhanced.

The first phosphor agent Y emitting the first color light C1 having the wavelength peak within 540-570 nanometers and the second phosphor agent R emitting the second color light C2 having the wavelength peak within 600-640 nanometers are selected, and then the first phosphor agent Y and the second phosphor agent R are mixed and formed on an aluminum substrate having a thickness of 100 mm. Then, the red light intensity test is performed at the color point Rx=0.670 and with different incident light wattages, and it is compared with the red light intensity obtained by using a conventional yellow phosphor agent, thereby obtaining results as shown in the following Table 4. According to the test results, by utilizing the first phosphor agent Y and the second phosphor agent R emitting the light having wavelength peaks within specific ranges to perform mixing, the light intensity of the red light can be effectively enhanced.

TABLE 4

| Wattage of the incident light (W) | red light intensity of the mixed phosphor agents/ red light intensity of the yellow phosphor |
| --- | --- |
| 25 | 192% |
| 76 | 163% |
| 102 | 156% |
| 152 | 127% |
| 170 | 120% |
| 200 | 105% |

Figure 8B:
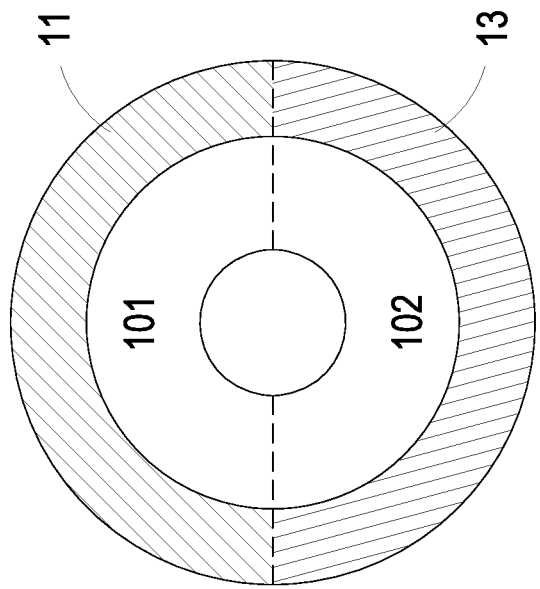
FIG. 8B schematically illustrates the structure of a phosphor device according to another embodiment of the present disclosure.
Figure 8A:
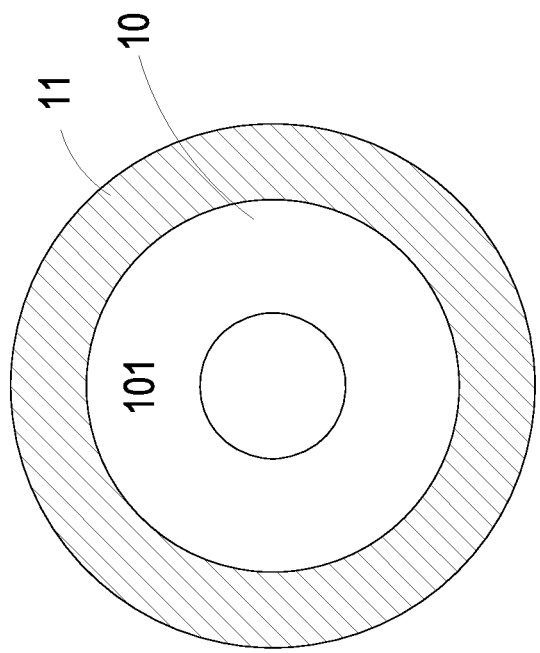
FIG. 8A schematically illustrates the structure of a phosphor device according to an embodiment of the present disclosure.
Figure 8C:
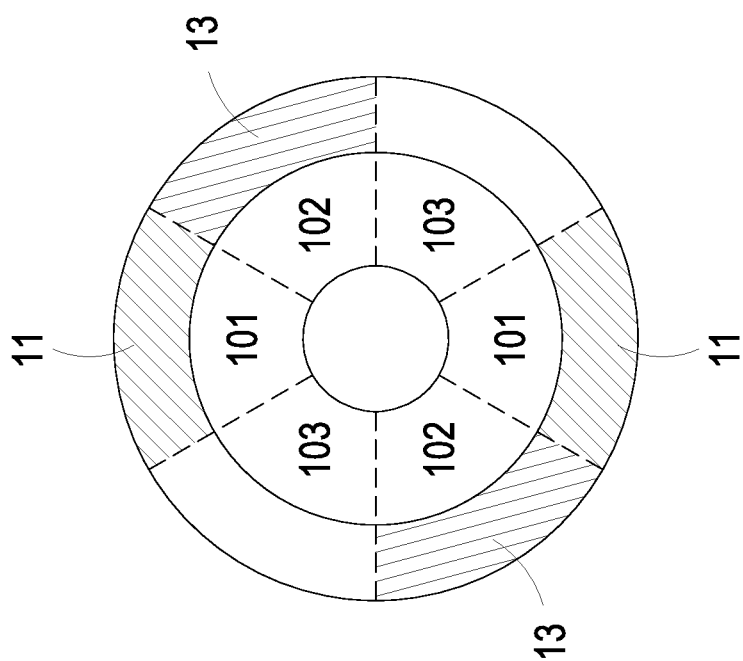
FIG. 8C schematically illustrates the structure of a phosphor device according to another embodiment of the present disclosure.

Please refer to FIG. 8A, FIG. 8B and FIG. 8C, and also refer to FIG. 1A, FIG. 1B, FIG. 3A and FIG. 3B. FIG. 8A schematically illustrates the structure of a phosphor device according to an embodiment of the present disclosure. FIG. 8B schematically illustrates the structure of a phosphor device according to another embodiment of the present disclosure. FIG. 8C schematically illustrates the structure of a phosphor device according to another embodiment of the present disclosure. In some embodiments, as shown in FIG. 8A, the phosphor device 1 can be a phosphor wheel, and the substrate 10 includes a first section 101. The phosphor layer 11 including the first phosphor agent Y and the second phosphor agent R is formed on the first section 101, so as to convert the first waveband light L1 into the second waveband light L2. The first waveband light L1 is blue light or ultraviolet light, the second waveband light L2 is orange light, the first phosphor agent Y is a yellow phosphor agent, and the second phosphor agent R is a red phosphor agent, but not limited herein. In some embodiments, a stereoscopic structure can be formed on the substrate 10 to increase the thermal turbulence and enhance the output efficiency of the red light.

In some embodiments, as shown in FIG. 8B, the phosphor device 1 further includes a third phosphor agent 13, and the first waveband light L1 is converted into a third waveband light by the third phosphor agent 13. Furthermore, the substrate 10 includes a first section 101 and a second section 102. The phosphor layer 11 including the first phosphor agent Y and the second phosphor agent R is formed on the first section 101, so as to convert the first waveband light L1 into the second waveband light L2. The third phosphor agent 13 is formed on the second section 102, so as to convert the first waveband light L1 into the third waveband light L3. The first waveband light L1 is blue light or ultraviolet light, the second waveband light L2 is orange light, the third waveband light is green light or yellow-green light, the first phosphor agent Y is a yellow phosphor agent, the second phosphor agent R is a red phosphor agent, and the third phosphor agent 13 is a green phosphor agent or a yellow-green phosphor agent, but not limited herein.

In some embodiments, as shown in FIG. 8C, the substrate 10 further includes a third section 103, and the third section 103 is a reflective section or a transparent section for directly reflecting the first waveband light L1 or for the first waveband light L1 to be transmitted through. The transparent section can be, for example, a hollow structure or glass coated with an optical film that the first wavelength band light L1 can be transmitted through, but not limited herein.

Figure 9:
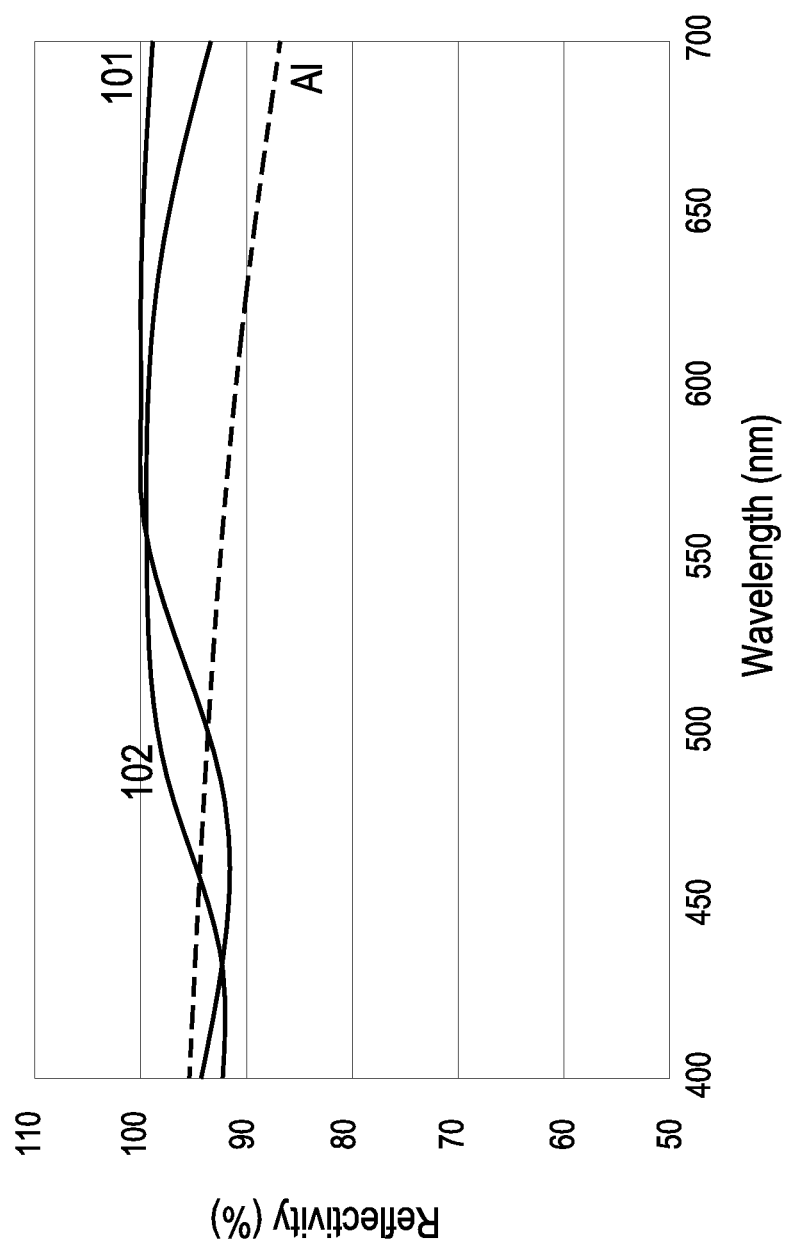
FIG. 9 schematically illustrates the reflection spectra of the first section and the second section shown in FIG. 8B and aluminum.

Please refer to FIG. 1A, FIG. 8B and FIG. 9. FIG. 9 schematically illustrates the reflection spectra of the first section and the second section shown in FIG. 8B and aluminum. In some embodiments, as shown in FIG. 1A, FIG. 8B and FIG. 9, the phosphor device 1 includes the first section 101, the phosphor layer 11 including the first phosphor agent Y and the second phosphor agent R, the second section 102 and the second phosphor agent 13. The first section 101 and the second section 102 are assembled as a reflective substrate. The reflective substrate is a glass substrate, a borosilicate glass substrate, a quartz substrate, a sapphire substrate, a calcium fluoride substrate, a silicon substrate, a silicon carbide substrate, a graphene thermally conductive substrate, an aluminum oxide substrate, a boron nitride substrate, or a substrate containing at least a metal material, wherein the metal material is aluminum, magnesium, copper, silver or nickel, but not limited herein. The phosphor layer 11 including the first phosphor agent Y and the second phosphor agent R is coated on the first section 101, and the third phosphor agent 13 is coated on the second section 102. One of the first section 101 and the second section 102 has a reflectance spectrum with a reflectivity corresponded to the second color light C2 greater than the reflectivity corresponded to the second color light C2 of aluminum, and the other one of the first section 101 and the second section 102 has a reflectance spectrum with a reflectivity corresponded to the third waveband light greater than the reflectivity corresponded to the third waveband light of aluminum. In particular, a metal reflection layer is formed on the first section 101 and the second section 102 of the reflective substrate, and a first dielectric film layer and a second dielectric film layer are reflectively plated on the metal reflection layer corresponded to the first section 101 and the second section 102 so as to adjust the reflectance spectrum of the metal reflection layer.

Please refer to FIG. 9. It illustrates that the performance of reflectivity of the first dielectric film layer is better than the performance of reflectivity of the second dielectric film layer in the range of the spectrum of red light, and the performance of reflectivity of the second dielectric film layer is better than the performance of reflectivity of the first dielectric film layer in the range of the spectrum of green light. Meanwhile, when the second color light C2 is red light and the third waveband light is green light, obviously the performance of reflectivity of the first section 101 in the range of the spectrum of red light and the performance of reflectivity of the second section 102 in the range of the spectrum of green light are both better than the performances of reflectivity of the first section 101 and the second section 102 only utilized aluminum as the metal reflection layer.

Furthermore, the first phosphor agent Y and the second phosphor agent R included in the phosphor layer 11 can be a yellow phosphor agent and a red phosphor agent, respectively, the third phosphor agent 13 can be a green phosphor agent or a yellow-green phosphor agent, and the output efficiency of the red light of the first section 101 and the output efficiency of the green light of the second section 102 of the phosphor device 1 of the present disclosure are enhanced compared with the output efficiencies of aluminum metal reflection layer of prior art.

In other words, in the phosphor device of the present disclosure, since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

From the above descriptions, the present disclosure provides a phosphor device. The phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved. Furthermore, by utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good. Meanwhile, by utilizing the second phosphor emitting light having a wavelength peak within a specific range and having a high luminous coefficient, the luminance and the purity of the specific color light can be effectively enhanced. In addition, since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor device of an illumination system emitting a first waveband light and having an optical path, the phosphor device at least comprising:
   a reflective substrate comprising a first section, wherein a metal reflection layer is formed on the first section of the reflective substrate, and the first section has a dielectric film layer, and wherein the dielectric film layer is plated on the metal reflection layer so as to adjust a reflectance spectrum of the metal reflection layer;
   a first phosphor agent coated on the first section,
   wherein the first phosphor agent is a yellow, green, or yellow-green phosphor agent, the first waveband light is received by the first phosphor agent and converted into a second waveband light, a range of a spectrum of the second waveband light comprises green light and red light, and the second waveband light is emitted to the optical path, so that the second waveband light is separated into at least two color lights in the optical path, and wherein one color light of the color lights is red light, and the dielectric film layer has a reflectance spectrum with a reflectivity corresponded to the red light; and a dichroic element disposed at a front end of the optical path, wherein the first waveband light is reflected by the dichroic element and the second waveband light is transmitted through the dichroic element, or the second waveband light is reflected by the dichroic element and the first waveband light is transmitted through the dichroic element.

2. A phosphor device of an illumination system emitting a first waveband light and having an optical path, the phosphor device comprising:

a reflective substrate comprising a first section; and a first phosphor layer, comprising:
   a first phosphor agent formed on the first section for converting the first waveband light into a second waveband light, wherein the second waveband light is emitted to the optical path, a range of a spectrum of the second waveband light comprises at least a first color light and a second color light, so that the second waveband light is separated into the second color light in the optical path; and
   a fourth phosphor agent distributed over the first phosphor agent for converting the first waveband light into the second color light so as to enhance the light intensity of the second color light, wherein a metal reflection layer is formed on the first section of the reflective substrate, and the first section includes a dielectric film layer, the dielectric film layer is plated on the metal reflection layer so as to adjust a reflectance spectrum of the metal reflection layer to the second color light.

3. The phosphor device according to claim 2 further comprising a second phosphor layer, wherein the second phosphor layer is disposed on the first phosphor layer, and the second phosphor layer comprises the first phosphor agent for converting the first waveband light into the second waveband light and decreasing energy of the first waveband light.

4. The phosphor device according to claim 2, wherein the first waveband light is blue light or ultraviolet light, a wavelength of the second waveband light is in a range between 450 nanometers and 710 nanometers, the first color light is green light, the second color light is red light, the first phosphor agent is a yellow or yellow-green phosphor agent, and the fourth phosphor agent is a red phosphor agent.

5. The phosphor device according to claim 2, wherein the first section has a reflectance spectrum with a reflectivity corresponded to the second color light greater than the reflectivity corresponded to the second color light of aluminum.

6. A phosphor device of an illumination system emitting a first waveband light and having an optical path, the phosphor device comprising:

a reflective substrate comprising a first section, a second section and a third section, wherein the first section has a reflectance spectrum with a reflectivity corresponded to a first color light greater than the reflectivity corresponded to the first color light of aluminum, the second section has a reflectance spectrum with a reflectivity corresponded to a second color light greater than the reflectivity corresponded to the second color light of aluminum, and the third section directly reflects the first waveband light;

a first phosphor agent coated on the first section for converting the first waveband light into a second waveband light, wherein a range of a spectrum of the second waveband light at least comprises the first color light; and a second phosphor agent coated on the second section for converting the first waveband light into a third waveband light, wherein a range of a spectrum of the third waveband light at least comprises the second color light, wherein the reflectance spectra of the first section and the second section and a reflectance spectrum of the third section are different from each other, and wherein a metal reflection layer is formed on the first section, the second section and the third section of the reflective substrate, the first section comprises at least a first dielectric film layer, the second section comprises at least a second dielectric film layer, and the first dielectric film layer and the second dielectric film layer are plated on the metal reflection layer so as to adjust a reflectance spectrum of the metal reflection layer.

7. The phosphor device according to claim 6, wherein the first color light is green light, the second color light is red light, the first waveband light is blue light or ultraviolet light, the second waveband light is green light or yellow light, the third waveband light is red light or yellow light, the first phosphor agent is a green, yellow, or yellow-green phosphor agent, and the second phosphor agent is a red, yellow, or yellow-green phosphor agent.

8. The phosphor device according to claim 6 further comprises a third phosphor agent, wherein the reflective substrate further comprises a fourth section, the third phosphor agent is coated on the fourth section for converting the first waveband light into a fourth waveband light, and a range of a spectrum of the fourth waveband light at least comprises the first color light and the second color light.

9. The phosphor device according to claim 8, wherein the fourth waveband light is yellow light, the third phosphor agent is a yellow or yellow-green phosphor agent, the fourth section has a reflectance spectrum with a reflectivity corresponded to yellow light greater than the reflectivity corresponded to the yellow light of aluminum, and the reflectance spectra of the first section, the second section, the third section and the fourth section are different from each other.

10. The phosphor device according to claim 6, wherein the reflective substrate is a glass substrate, a boron silicate glass substrate, a quartz substrate, a sapphire substrate, a calcium fluoride substrate, a silicon substrate, a silicon carbide substrate, a graphene heat conductive substrate, an alumina substrate, a boron nitride substrate, or a substrate contains at least one metal material, and wherein the metal material is aluminum, magnesium, copper, silver or nickel.

11. A phosphor device of an illumination system emitting a first waveband light and having an optical path, the phosphor device comprising:

a reflective substrate comprising a first section and a second section;

a first phosphor agent coated on the first section for converting the first waveband light into a second waveband light, wherein a range of a spectrum of the second waveband light at least comprises a first color light and a second color light; and a second phosphor agent coated on the second section for converting the first waveband light into a third waveband light, wherein a range of a spectrum of the third waveband light at least comprises the first color light and the second color light, wherein the ranges of the spectra of the second waveband light and the third waveband light are at least partially overlapped, and wherein a metal reflection layer is formed on the first section and the second section of the reflective substrate, the first section comprises at least a first dielectric film layer, the second section comprises at least a second dielectric film layer, the first dielectric film layer and the second dielectric film layer are plated on the metal reflection layer so as to adjust a reflectance spectrum of the metal reflection layer, and reflectance spectra of the first dielectric film layer and the second dielectric film layer are different from each other.

12. The phosphor device according to claim 11, wherein the first section has a reflectance spectrum with a reflectivity corresponded to the first color light greater than the reflectivity corresponded to the second color light.

13. A phosphor device of an illumination system emitting a first waveband light and having an optical path, the phosphor device at least comprising:

a reflective substrate comprising a first section and a second section;

a first phosphor agent coated on the first section; and a second phosphor agent coated on the second section, wherein the first phosphor agent and the second phosphor agent are yellow, green, or yellow-green phosphor agents, the first phosphor agent and the second phosphor agent receive the first waveband light and respectively convert the first waveband light into second waveband lights, and the spectra of the second waveband lights are at least partially overlapped and comprise green light and red light, wherein the ingredients of the first phosphor agent and the second phosphor agent are different so as to respectively convert the first waveband light into two kinds of the second waveband lights entering the optical path in sequence, thereby being separated into at least two color lights, wherein one color light of the color lights is red light, and wherein a metal reflection layer is formed on the first section and the second section of the reflective substrate, the first section comprises at least a first dielectric film layer, the second section comprises at least a second dielectric film layer, the first dielectric film layer and the second dielectric film layer are plated on the metal reflection layer so as to adjust a reflectance spectrum of the metal reflection layer.

14. The phosphor device according to claim 13, wherein the first section and the second section have different reflectance spectra, and the first section has a better reflectivity spectrum in a range of red light than the second section.

* * * * *